United States Patent

Prissok et al.

[11] Patent Number: 5,900,439
[45] Date of Patent: May 4, 1999

[54] STABILIZED POLYURETHANES

[75] Inventors: Frank Prissok, Lemförde; Günter Scholz, Lemfoerde, both of Germany

[73] Assignee: BASF Aktiengesellschaft, Ludwigshafen, Germany

[21] Appl. No.: 08/919,686

[22] Filed: Aug. 28, 1997

[51] Int. Cl.$^6$ .................................................. C08G 18/65
[52] U.S. Cl. ........................ 521/128; 528/73; 524/720; 524/753; 521/156
[58] Field of Search ............................... 528/73; 524/720, 524/753; 521/128, 156

[56] References Cited

U.S. PATENT DOCUMENTS

| | | | |
|---|---|---|---|
| 4,814,103 | 3/1989 | Potter et al. | 524/101 |
| 5,124,382 | 6/1992 | Kohler et al. | 524/114 |
| 5,217,806 | 6/1993 | Matthies et al. | 428/375 |
| 5,219,939 | 6/1993 | Wamprecht et al. | 525/117 |
| 5,484,827 | 1/1996 | Prissok et al. | 524/86 |
| 5,492,949 | 2/1996 | Drewes et al. | 524/114 |
| 5,684,071 | 11/1997 | Mogami et al. | 524/100 |

*Primary Examiner*—Rachel Gorr
*Attorney, Agent, or Firm*—Fernando A. Borrego; James J. Drake

[57] ABSTRACT

Stabilized polyurethanes comprise as stabilizers diglycidyl terephthalate and/or triglycidyl trimellitate in combination with UV filters. Corresponding stabilizer concentrates are also provided.

18 Claims, No Drawings

STABILIZED POLYURETHANES

The present invention relates to stabilized polyurethanes, preferably thermoplastic polyurethanes, comprising specific stabilizers as a stabilizer combination or as a stabilizer concentrate, and also a process for preparing polyurethanes using these stabilizers.

Cellular or compact polyurethanes, in particular polyurethane casting elastomers and thermoplastic polyurethanes (TPU), have long been known from numerous patent and literature publications. Their industrial importance is based on the combination of valuable mechanical properties with the advantages of low-cost processing methods. The use of different chemical formative components in different ratios makes it possible to prepare thermoplastically processable or crosslinked, compact or cellular polyurethanes having a wide variety of mechanical and processing properties. An overview of polyurethanes and their properties and applications is given, for example, in Kunststoff-Handbuch, Volume 7, Polyurethane, 1st Edition, 1966, edited by Dr. R. Vieweg and Dr. A. Höchtlen, and 2nd Edition, 1983, and also 3rd Edition, 1993, edited by Dr. G. Oertel, (Carl Hanser Verlag, Munich, Vienna).

Polyurethane casting elastomers can be obtained by introducing, eg. by casting or injecting, a reaction mixture into an open or closed mold and curing this mixture.

TPUs can be prepared continuously or batchwise by various methods. The best known, viz. the belt process and the extruder process, are also utilized industrially.

According to GB-A-1 057 018, a prepolymer is prepared from an essentially linear polyhydroxyl compound and excess organic diisocyanate and this prepolymer is fed by means of a metering pump to a mixing head and is there mixed with a certain amount of a low molecular weight diol. The reaction mixture obtained is brought onto a conveyor belt and conveyed until it solidifies through an oven heated to from 70 to 130° C. The reaction product is then comminuted, heated at 120° C. for from 6 to 40 hours and can then, for example, be processed into shaped bodies using injection-molding machines.

In the extruder process, which is described, for example, in DE-A-20 59 570 (US-A-3 642 964), the formative components are introduced directly into the extruder and the reaction is carried out in the extruder under particular process conditions. The polyurethane elastomer formed is converted into the thermoplastic state, extruded as a continuous extrudate, cooled until it solidifies in an inert gas atmosphere and comminuted. A disadvantage of this process is that the TPUs obtained are not suitable for producing films or fine profiles and hoses. TPUs of the same composition prepared by the extruder process are transparent, while those from the belt process have an opaque appearance. Opaque TPUs can be processed to give films which display no blocking, while transparent TPUs are unsuitable for this purpose.

The polyurethanes can be prepared using the formative components known per se, for example diisocyanates and polyisocyanates, relatively high molecular weight polyhydroxyl compounds, low molecular weight chain extenders and crosslinkers and also further auxiliaries and additives.

Unstabilized polyurethane is sensitive to heat and UV radiation; it tends to undergo oxidation reactions. The main points of attack are, for both types of polyurethane, the isocyanate components which often contain aromatic systems and also, in the case of polyether polyurethanes, the ether bonds which can be oxidized by atmospheric oxygen to form peroxides; in the case of the polyester polyurethanes, it is the ester bonds which are essentially attacked by $H^+$ ions.

To avoid these disadvantages, stabilizers are incorporated into the polyurethane elastomers or the formative components used for their preparation. Hydrolysis inhibitors which have been found to be useful are, for example, carbodiimides (W. Goyert and H. Hespe, TPU-Eigenschaften und Anwendungen; Kunststoffe 68 (1978), pages 819 ff). Suitable stabilizers which have been described for preventing thermal oxidation are antioxidants such as 4,4'-thio-bis(3-methyl-6-tert-butylphenol), phenothiazines and 2,2'-thio-bis(4-methyl-6-isobornylphenol). UV stabilizers used are, for example, substituted resorcinols, salicylates, benzotriazoles and benzophenones. Also used are stabilizer combinations comprising a UV stabilizer and an antioxidant, eg. 2-(2'-hydroxy-3', 5'-di-tert-amyl) benzotriazole and tetrakis-[methylene 3-(3', 5'-di-tert-butyl-4'-hydroxyphenyl)propionate]-methane. (Advances in Urethane Science and Technology, Volume 4, pages 68 ff, and Volume 6, pages 103 ff; ®Technomic Publishing Co.). According to DD-A-238 992, the epoxidized synthetic products such as epoxidized triglycerides, alkylepoxy stearates, phthalates, tetrahydrophthalates or epoxidized natural products such as epoxidized soybean oil, rape oil and the like are used as hydrolysis stabilizers for PU elastomers based on polyester polyols. According to EP-A-262 527 (US-A-4775558), cellular or compact polyurethanes which are joined to or combined with other materials such as PVC, ABS, copolymers and homopolymers of vinyl chloride, styrene, butadiene, isoprene, chloroprene, ethylene, propene or acrylonitrile, polyvinyl acetate or polyvinyl butyral can be stabilized against thermolysis and contact discoloration by the addition of epoxides, preferably higher-functional epoxides having an epoxide equivalent weight of from 57 to 10,000. The addition of epoxides in the preparation of PU elastomers, the application of polyurethanes to epoxide materials or mixing polyurethanes with epoxy resins enable plastics having improved mechanical properties to be obtained. Although the addition of stabilizers was able to improve considerably the mechanical properties of the polyurethane elastomers prepared, these often still do not meet the high mechanical demands made of them, in particular for specific areas of application.

EP-A-0 564 931 describes a stabilizer combination comprising triglycidyl isocyanurate and a benzotriazole as concentrate with a TPU. It is a disadvantage for many applications that the triglycidyl isocyanurate leads to undesired crosslinking reactions during processing of the TPU.

It is an object of the present invention to develop a polyurethane which has not only good mechanical properties but also displays good stability, particularly in respect of UV and thermal degradation, with the stabilizers causing no or insignificant crosslinking.

We have found that this object is achieved by using diglycidyl terephthalate and/or triglycidyl trimellitate in combination with UV filters for stabilizing the polyurethane.

The present invention accordingly provides a stabilized polyurethane comprising as stabilizer diglycidyl terephthalate and/or triglycidyl trimellitate in combination with UV filters.

The invention further provides a stabilizer concentrate consisting of, based on the total weight, A) from 20 to 95% by weight of at least one polyurethane,
B) from 3 to 60% by weight of diglycidyl terephthalate and/or triglycidyl trimellitate and
C) from 3 to 60% by weight of at least one UV filter of the benzotriazole type, and also a process for preparing stabilized polyurethanes by reacting organic and/or modified organic polyisocyanates with relatively high molecular weight compounds containing at least two reactive hydrogen atoms and, if desired, low molecular weight chain extenders and/or crosslinkers and also blowing agents in the presence of catalysts, stabilizers and, if desired, further auxiliaries and/or additives, wherein said stabilizer combinations or concentrates are used as stabilizers.

It has surprisingly been found that polyurethanes, in particular TPUs, to which diglycidyl terephthalate and/or triglycidyl trimellitate in combination with UV filters, preferably of the benzotriazole type, have been added display very good resistance to heat aging and UV radiation. A synergistic effect of the actions of the stabilizer substances whereby, in particular, the stabilization against UV radiation is further improved is observed. The system of the present invention displays reduced crosslinking in high-concentration applications.

As UV filters, preference is given to using those of the benzotriazole type. Particular preference is given to 2-(2-hydroxy-3,5-di-tert-amylphenyl)-2H-benzotriazole and/or 1,6-hexanediyl bis[3-(3-{benzotriazol-N-yl}-4-hydroxy-5-tert-butylphenyl)propanoate]. However, it is also possible to use other UV absorbers such as phenol, 2-(2H-benzotriazol-2-yl)-4-methyl-6-dodecylphenol, 2,2'-methylene-bis(6-{2H-benzotriazol-2-yl}-4-{1,1,3,3-tetramethylbutyl}phenol) and 2-(2H-benzo-triazol-2-yl)-4,6-bis(1,1-dimethylethyl)phenol.

A stabilizer which is particularly advantageous and is therefore preferably used is a combination of diglycidyl terephthalate, triglycidyl trimellitate and 2-(2-hydroxy-3,5-di-tert-amyl-phenyl)-2H-benzotriazole.

The stabilizer combination is, based on the polyurethane, preferably present in a total amount of from 0.01 to 3% by weight, particularly preferably from 0.1 to 1.5% by weight. In a particularly advantageous embodiment, the individual constituents diglycidyl terephthalate, triglycidyl trimellitate and UV filter are used in a ratio of from 1:1:2 to 1:1:1.

During processing of the polyurethanes, a crosslinking reaction does not occur even in the case of an epoxide content significantly more than 1% by weight as stabilizer.

The stabilized polyurethanes of the present invention are prepared in a customary manner by reacting organic and/or modified organic polyisocyanates (a) with relatively high molecular weight compounds containing at least two reactive hydrogen atoms (b) and, if desired, low molecular weight chain extenders and/or crosslinkers (c) in the presence of stabilizers (d) and catalysts (e) and also, if desired, further auxiliaries and/or additives (f), with use being made as stabilizers (d) of diglycidyl terephthalate and/or triglycidyl trimellitate in combination with UV filters as described above.

In the preparation of the polyurethanes, the stabilizer components can be added in a customary manner either individually, simultaneously or in succession or as a complete or partial combination.

However, it is particularly advantageous first to make a stabilizer concentrate consisting of, based on the total weight, A) from 20 to 95% by weight of at least one polyurethane,
B) from 3 to 60% by weight of diglycidyl terephthalate and/or triglycidyl trimellitate and
C) from 3 to 60% by weight of at least one of the above-described UV filters.

The stabilizer concentrate is easy to prepare, can readily be metered in and is simple to handle.

The stabilized polyurethanes of the present invention are also, in this case, prepared by reacting organic and/or modified organic polyisocyanates (a) with relatively high molecular weight compounds containing at least two reactive hydrogen atoms (b) and, if desired, low molecular weight chain extenders and/or crosslinkers (c) in the presence of stabilizers (d) and catalysts (e) and also, if desired, further auxiliaries and/or additives (f), but using as stabilizer (d) a stabilizer concentrate consisting of, based on the total weight, A) from 20 to 95% by weight of at least one polyurethane,
B) from 3 to 60% by weight of diglycidyl terephthalate and/or triglycidyl trimellitate and
C) from 3 to 60% by weight of at least one UV filter.

In principle, all polyurethanes are suitable for the stabilization according to the present invention. Particularly advantageous results have been obtained with TPUs, particularly when using the stabilizer concentrate.

In order that the polyurethane elastomer matrix does not impair the stabilizing effect of the stabilizer concentrates, they are advantageously prepared using TPUs (A) having a hardness in the range from Shore A 78 to Shore A 98, preferably from Shore A 80 to A 88, which are obtained by reacting an organic diisocyanate, preferably diphenylmethane 4,4'-diisocyanate with a polyhydroxyl compound having a molecular weight of from 800 to 3000, preferably from 1000 to 2500, selected from the group consisting of polyoxybutylene glycols, poly-1,4-butanediol adipates, poly-1,6-hexanediol adipates and poly-1,4-butanediol-1,6-hexanediol adipates and an alkanediol having from 2 to 6 carbon atoms, preferably from 4 to 6 carbon atoms, in particular 1,4-butanediol, as chain extender.

TPUs (A) prepared by the belt process have been found to be particularly useful for preparing the stabilizer concentrates of the present invention.

Within the percentage range given above for the stabilizers (B) and (C), they are advantageously used in a weight ratio of from 0.5:1 to 1:0.5 and preferably of 1:1.

A UV stabilizer concentrate which has been found to have excellent handling properties from a production point of view consists of, based on the total weight, A) from 50 to 80% by weight of at least one TPU,
B) from 10 to 25% by weight of diglycidyl terephthalate and/or triglycidyl trimellitate and
C) from 10 to 25% by weight of 2-(2-hydroxy-3,5-di-tert-amylphenyl)-2H-benzotriazole.

Particular preference is given to using a stabilizer concentrate consisting of 75% by weight of (A), 12.5% by weight of (B) and 12.5% by weight of (C).

With the exception of the stabilizer components according to the present invention, both the stabilized polyurethanes and the polyurethane A) required for the stabilizer concentrate are prepared using the starting components customary in polyurethane chemistry:

a) Suitable organic and/or modified organic polyisocyanates are, in particular, aliphatic, cycloaliphatic or preferably aromatic diisocyanates. Specific examples are: aliphatic diisocyanates such as hexamethylene 1,6-diisocyanate, 2-methylpentamethylene 1,5-diisocyanate, 2-ethylbutylene 1,4-diisocyanate or mixtures of at least two of the aliphatic diisocyanates mentioned; cycloaliphatic diisocyanates such as isophorone diisocyanate, cyclohexane 1,4-diisocyanate, 1-methylcyclohexane 2,4- or 2,6-diisocyanate and also the corresponding isomer mixtures, dicyclohexylmethane 4,4'-, 2,4'- and 2,2'-diisocyanate and also the corresponding isomer mixtures; and preferably aromatic diisocyanates such as tolylene 2,4-diisocyanate, mixtures of tolylene 2,4- and 2,6-diisocyanate, diphenylmethane 4,4'-, 2,4'- and 2,2'- diisocyanate, mixtures of diphenylmethane 2,4'- and 4,4'-diisocyanate, urethane-modified liquid diphenylmethane 4,4'- and/or 2,4'-diisocyanates, 4,4'-diisocyanato(1,2-diphenylethane), mixtures of 4,4'-, 2,4'- and 2,2'-diisocyanato(1,2-diphenylethane), advantageously those having a 4,4'-diisocyanato(1,2-diphenylethane) content of at least 95% by weight, and naphthylene 1,5-diisocyanate. Preference is given to using diphenylmethane diisocyanate isomer mixtures having a diphenylmethane 4,4'-diisocyanate content of greater than 96% by weight and in particular essentially pure diphenylmethane 4,4'-diisocyanate.

The organic diisocyanates can, if desired, be replaced by subordinate amounts, eg. amounts of up to 3 mol %, preferably up to 1 mol %, based on the organic diisocyanate, of a trifunctional or higher-functional polyisocyanate, but its amount has to be limited to an amount such that thermoplastically processable polyurethanes are still obtained. A relatively large amount of such isocyanates having a functionality of more than 2 is advantageously compensated by the concomitant use of compounds containing reactive hydrogen atoms which have a functionality of less than 2, so that excessive chemical crosslinking of the polyurethane is avoided. Examples of isocyanates having a functionality of more than 2 are mixtures of diphenylmethane diisocyanates and polyphenylpolymethylene polyisocyanates, known as raw MDI, and also liquid diphenylmethane 4,4'-and/or 2,4'-diisocyanates modified with isocyanurate, urea, biuret, allophanate, urethane and/or carbodiimide groups. Examples of suitable monofunctional compounds containing a reactive hydrogen atom, which can also be used as molecular weight regulators, are: monoamines such as butylamine, dibutylamine, octylamine, stearylamine, N-methylstearylamine, pyrrolidone, piperidine and cyclohexylamine, and monoalcohols such as butanol, amyl alcohol, 1-ethylhexanol, octanol, dodecanol, cyclohexanol and ethylene glycol monoethyl ether.

However, particular preference is given to using: (i) polyisocyanates containing carbodiimide and/or urethane groups derived from diphenylmethane 4,4'-diisocyanate or a mixture of diphenylmethane 4,4'- and 2,4'-diisocyanates and having an NCO content of from 33.6 to 8% by weight, (ii) NCO-containing prepolymers having an NCO content of from 8 to 25% by weight, based on the prepolymer weight, prepared by reacting polyoxyalkylene polyols having a functionality of from 2 to 4 and a molecular weight of from 600 to 6000 with diphenylmethane 4,4'-diisocyanate or a mixture of diphenylmethane 4,4'- and 2,4'-diisocyanates and mixtures of (i) and (ii).

b) As relatively high molecular weight compounds containing at least two reactive hydrogen atoms, it is possible to use, for example, those having a functionality of from 2 to 4 and molecular weights of from 500 to 8000. Compounds which have been found to be useful are particularly polyether diols and in particular polyester diols. Use is made of, for example, polybutadiene diols with which good results are obtained, particularly in the preparation of crosslinkable TPUs. Also suitable are other hydroxyl-containing polymers having ether or ester groups in the polymer chain, for example polyacetals such as polyoxymethylene and in particular water-insoluble formals, eg. polybutanediol formal and polyhexanediol formal, and polycarbonates, in particular those prepared from diphenyl carbonate and 1,6-hexanediol by transesterification. The polyhydroxyl compounds should be at least predominantly linear and have to be essentially difunctional in the context of the isocyanate reaction. The polyhydroxyl compounds mentioned can be used as individual compounds or in the form of mixtures.

Suitable polyether diols can be prepared by known methods, for example from one or more alkylene oxides having from 2 to 4 carbon atoms in the alkylene radical by anionic polymerization using alkali metal hydroxides such as sodium or potassium hydroxide, or alkali metal alkoxides such as sodium methoxide, sodium or potassium ethoxide or potassium isopropoxide as catalysts and with addition of at least one initiator molecule containing 2 or 3, preferably 2, reactive hydrogen atoms in bonded form, or by cationic polymerization using Lewis acids such as antimony pentachloride, boron fluoride etherate, etc., or bleaching earth as catalysts.

Examples of suitable alkylene oxides are tetrahydrofuran, 1,3-propylene oxide, 1,2- or 2,3-butylene oxide and particularly preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid and/or glutaric acid, alkanolamines such as ethanolamine, N-alkylalkanol-amines, N-alkyldialkanolamines such as N-methyldiethanolamine and N-ethyldiethanolamine and preferably dihydric alcohols which may contain bonded ether bridges, e.g. ethanediol, 1,2-and 1,3-propanediol, 1,4-butanediol, diethylene glycol, 1,5-pentanediol, 1,6-hexanediol, dipropylene glycol, 2-methylpentane-1,5-diol and 2-ethylbutane-1,4-diol. The initiator molecules can be used individually or as mixtures.

Preference is given to using polyetherols derived from 1,2-propylene oxide and ethylene oxide in which more than 50%, preferably from 60 to 80%, of the OH groups are primary hydroxyl groups and in which at least part of the ethylene oxide is present as a terminal block. Such polyetherols can be obtained by, for example, polymerizing first the 1,2-propylene oxide and subsequently thereto the ethylene oxide onto the initiator molecule or first copolymerizing all the 1,2-propylene oxide together with part of the ethylene oxide and subsequently polymerizing on the remainder of the ethylene oxide or, stepwise, first polymerizing part of the ethylene oxide, then all the 1,2-propylene oxide and then the remainder of the ethylene oxide onto the initiator molecule.

Other particularly suitable polyetherols are the hydroxyl-containing polymerization products of tetrahydrofuran.

The essentially linear polyetherols usually have molecular weights of from 500 to 8000, preferably from 600 to 6000 and in particular from 800 to 3500, with the polyoxytetramethylene glycols preferably having molecular weights of from 500 to 2800. They can be used either individually or in the form of mixtures with one another.

Suitable polyester diols can be prepared, for example, from dicarboxylic acids having from 2 to 12, preferably from 4 to 6, carbon atoms and diols. Examples of suitable dicarboxylic acids are: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids can be used individually or as mixtures, e.g. in the form of a succinic, glutaric and adipic acid mixture. For preparing the polyesterols, it may be advantageous to replace the dicarboxylic acids with the corresponding dicarboxylic acid derivatives such as monoesters or diesters of dicarboxylic acid having from 1 to 4 carbon atoms in the alcohol radical, dicarboxylic anhydrides or dicarboxylic acid dichlorides. Examples of diols are glycols having from 2 to 10, preferably from 2 to 6, carbon atoms, for example ethylene glycol, diethylene glycol, 1,4-butanediol, 1,5-pentanediol, 1,6-hexanediol, 1,10-decanediol, 2,2-dimethylpropane-1,3-diol, 1,3-propanediol and dipropylene glycol. Depending on the desired properties, the diols can be used alone or in admixture with one another.

Also suitable are esters of carbonic acid with the diols mentioned, in particular those having from 4 to 6 carbon atoms, e.g. 1,4-butanediol and/or 1,6-hexanediol; condensation products of ω-hydroxycarboxylic acids, for example ω-hydroxycaproic acid, and preferably polymerization products of lactones, for example unsubstituted or substituted ε-caprolactone.

Polyester diols which are preferably used are ethanediol polyadipates, 1,4-butanediol polyadipates, ethanediol-1,4-butanediol polyadipates, 1,6-hexanediol-neopentyl glycol polyadipates, 1,6-hexanediol-1,4-butanediol polyadipates and polycaprolactones.

The polyester diols generally have molecular weights of from 500 to 6000, preferably from 800 to 3500.

Suitable chain extenders having molecular weights of generally from 60 to 400, preferably from 60 to 300, are preferably aliphatic diols having from 2 to 12 carbon atoms, preferably having 2, 4 or 6 carbon atoms, e.g. ethanediol, 1,6-hexanediol, diethylene glycol, dipropylene glycol and in particular 1,4-butanediol. However, other suitable chain extenders are diesters of terephthalic acid with glycols having from 2 to 4 carbon atoms, e.g. bis(ethylene glycol) terephthalate or bis(1,4-butanediol) terephthalate and hydroxyalkylene ethers of hydroquinone, e.g. 1,4-di(β-hydroxyethyl) hydroquinone and also polytetramethylene glycols having molecular weights of from 162 to 378.

Depending on the desired properties of the polyurethanes of the present invention, the amounts of the formative components (b) and (c) which are used can be varied within a relatively wide range of molar ratios. In the case of the TPUs preferably prepared, this enables the hardness and melt flow index to be adjusted, with the hardness and the melt viscosity rising with an increasing content of chain extenders (c), while the melt flow index falls.

To prepare relatively soft TPUs, e.g. those having a Shore A hardness of less than 95, preferably from 95 to 75 Shore A, use can be made, for example, of the essentially difunctional polyhydroxyl compounds (b) and diols (c) in molar ratios of advantageously from 1:1 to 1:5, preferably from 1:1.5 to 1:4.5, so that the resulting mixtures of (b) and (c) have a hydroxyl equivalent weight of greater than 200, in particular from 230 to 450, while to prepare relatively hard TPUs, e.g. those having a Shore A hardness of greater than 98, preferably from 55 to 75 Shore D, the molar ratios of (b):(c) are in the range from 1:5.5 to 1:15, preferably from 1:6 to 1:12, so that the resulting mixtures of (b) and (c) have a hydroxyl equivalent weight of from 110 to 200, preferably from 120 to 180.

d) As stabilizers against UV and thermal degradation, use is made in particular of the above-described stabilizers, stabilizer combinations or stabilizer concentrates of the present invention.

However, other stabilizers customary in polyurethane chemistry can also be additionally used as further auxiliaries and additives (f).

e) Suitable catalysts for preparing the polyurethanes of the present invention, which, in particular, accelerate the reaction between the NCO groups of the diisocyanates (a) and the hydroxyl groups of the formative components (b) and (c), are the customary catalysts known from the prior art, for example tertiary amines such as triethylamine, dimethylcyclohexylamine, N-methylmorpholine, N,N'-dimethylpiperazine, diazabicyclo[2.2.2]octane and the like, and also, in particular, organic metal compounds such as titanate esters, iron compounds, tin compounds, e.g. tin diacetate, tin dioctoate, tin dilaurate or the dialkyltin salts of aliphatic carboxylic acids, e.g. dibutyltin diacetate, dibutyltin dilaurate or the like. The catalysts are usually used in amounts of from 0.001 to 0.1 part by weight per 100 parts by weight of the mixture of polyhydroxyl compound (b) and chain extender (c).

f) In addition, further auxiliaries and/or additives can also be added to the formative components in the preparation of the polyurethanes of the present invention. Examples which may be mentioned are blowing agents, lubricants, inhibitors, stabilizers against hydrolysis or discoloration, dyes, pigments, inorganic and/or organic fillers and reinforcers.

These auxiliaries and/or additives can be introduced into the formative components or into the reaction mixture for preparing the polyurethanes. According to another process variant, these auxiliaries and/or additives (f) can be mixed with the polyurethane and, particularly in the case of TPU, subsequently melted or they are incorporated directly into the melt.

The auxiliaries and/or additives which can be used may be found in the specialist literature, for example the monograph by J. H. Saunders and K. C. Frisch "High Polymers", Volume XVI, Polyurethane, Parts 1 and 2 (Interscience Publishers 1962 and 1964), the Kunststoff-Handbuch, Volume 7, Polyurethane 1st, 2nd and 3rd Editions (Carl Hanser Verlag, 1966, 1983 and 1993) or DE-A-29 01 774.

To prepare the polyurethanes of the present invention, the formative components (a), (b) and, if desired, (c) are reacted in the presence of the stabilizers of the present invention (d) and of catalysts (e) and, if desired, auxiliaries and/or additives (f) in amounts such that the equivalence ratio of NCO groups of the diisocyanates (a) to the sum of the hydroxyl groups of the components (b) and (c) is 0.95–1.20:1, preferably 0.98–1.08:1 and in particular about 1.0–1.05:1.

To prepare the stabilizer concentrates of the present invention, in particular those based on TPUs, the stabilizers (B) and (C) are incorporated successively or preferably simultaneously into the fully reacted, at least flowable, preferably molten TPU (A) at from 170 to 220° C., preferably from 180 to 200° C. Suitable processing apparatuses for this purpose are, for example, roll mills, kneaders and preferably extruders, in particular twin-screw extruders. The resulting UV stabilizer concentrates can then be subjected to intermediate storage or be granulated directly, with the granules advantageously having an average particle diameter of less than 6 mm, preferably from 2 to 4 mm.

The stabilizer concentrates of the present invention are preferably used for stabilizing TPUs known per se prepared by the extruder or belt process from customary starting materials against UV and thermal degradation.

For this purpose, from 0.5 to 12 parts by weight, preferably from 1 to 10 parts by weight and in particular from 2 to 5 parts by weight, of the UV stabilizer concentrate are intensively mixed with 100 parts by weight of TPU, preferably in the form of granules, at from 10 to 220° C. and the stabilizer concentrate/TPU mixture is then thermoplastically processed at from 170 to 220° C., preferably from 180 to 210° C., for example by blowing to produce films or by injection-molding to produce molding. According to another process variant, the UV stabilizer concentrates can also be introduced directly, e.g. by means of an extruder, into the TPU melt, homogeneously mixed and extruded to produce a molding.

The following examples illustrate the invention:

EXAMPLES C1 to C4 and E1 to E4

1000 parts by weight of polytetrahydrofuran having a mean molecular weight of 1000 were reacted with 600 parts by weight of 4,4'-MDI and 121 parts by weight of 1,4-butanediol to give a TPU and in the process admixed with the components shown in Table 1.

TABLE 1

| Example No. | Diglycidyl terephthalate | Triglycidyl trimellitate | Anti-oxidant* | Benzo-triazole* |
|---|---|---|---|---|
| Comparison C1 | — | — | — | — |
| Comparison C2 | — | — | 1% | — |
| Comparison C3 | — | — | 1% | 1% |
| Comparison C4 | 0.5% | 0.5% | 1% | — |
| Example E1 | 0.125% | 0.125% | 1% | 0.25% |
| Example E2 | 0.25% | 0.25% | 1% | 0.5% |
| Example E3 | 0.625% | 0.625% | 1% | 0.75% |
| Example E4 | 0.5% | 0.5% | 1% | 1% |

Benzotriazole* = 2-(2-hydroxy-3,5-di-tert-amylphenyl)-2H-benzotriazole
Antioxidant* = pentaerythrityl tetrakis [3-(3,5-di-tert-butyl-4-hydroxyphenyl)propionate]

C1 amd E3 were carried out by manual casting. Here, the stabilizers were added directly and intensively mixed in. The reaction product was processed to give test specimens. The other examples were carried out using the belt process. The antioxidant was, if used, mixed in during the preparation of the TPU. The stabilizers of the present invention were added here in the form of a concentrate.

Preparation of the stabilizer concentrate of the present invention:

75 parts by weight of a TPU obtained using the belt process by reaction of polytetrahydrofuran, 4,4'-MDI and 1,4-butanediol in the amounts indicated above were melted in an extruder and intensively mixed at 200° C. with 6.25 parts by weight of diglycidyl terephthalate, 6.25 parts by weight of triglycidyl trimellitate and 12.5 parts by weight of the benzotriazole defined above.

The homogeneous mixture was extruded and granulated. The stabilizer concentrate was added to the above-described TPU mix in the following amounts and homogeneously mixed in:

E1 2 parts by weight

E2 4 parts by weight

E4 8 parts by weight

The reaction product was processed into test specimens.

Products giving the results shown in Tables 2 to 4 were obtained.

TABLE 2

Intrinsic color of the products

| Example No. | YI | L* | A* | B* |
|---|---|---|---|---|
| Comparison C1 | 3.6 | 96.6 | −0.4 | 1.6 |
| Comparison C2 | 3.0 | 46.1 | −0.4 | 1.8 |
| Comparison C3 | 4.9 | 96.2 | −1.1 | 3.3 |
| Comparison C4 | 3.6 | 96.1 | −0.5 | 2.2 |
| Example E1 | 4.8 | 95.8 | −0.6 | 3.0 |
| Example E2 | 7.7 | 95.0 | −1.1 | 4.8 |
| Example E3 | 10.6 | 94.6 | −1.3 | 6.7 |
| Example E4 | 11.9 | 94.4 | −1.4 | 7.5 |

YI    Yellowness Index
L*A*B* Color values from the CIELAB system

TABLE 3

Properties after storage for 500 hours at 130° C. in a convection oven

| Example No. | TS/MPa | EB/% | DE* | YI |
|---|---|---|---|---|
| Comparison C1 | 10 | 380 | 99.8 | 204.1 |
| Comparison C2 | 18 | 830 | 78.3 | 107.9 |
| Comparison C3 | 17 | 710 | 81.2 | 108.5 |
| Comparison C4 | 29 | 730 | 60.1 | 89.1 |
| Example E1 | 21 | 770 | 79.4 | 111.1 |
| Example E2 | 20 | 780 | 72.2 | 105.8 |
| Example E3 | 23 | 810 | 67.3 | 102.5 |
| Example E4 | 25 | 730 | 68.6 | 106.1 |

TS    tensile strength    DIN 53 504
EB    elongation at break    DIN 53 504
DE*    Delta E* from the LAB* color system (color change compared with unilluminated specimen)
YI    Yellowness Index Small DE* and YI values show low discoloration or yellowing.

TABLE 4

Properties after UV illumination in accordance with DIN 75202 (100° C. black-body temperature)

| Example No. | DE* 300 h | YI 300 h | DE* 500 h | YI 500 h |
|---|---|---|---|---|
| Comparison C1 | 35.1 | 58.0 | 50.1 | 78.2 |
| Comparison C2 | 29.6 | 47.2 | 42.4 | 64.2 |
| Comparison C3 | 19.8 | 37.0 | 28.7 | 42.1 |
| Comparison C4 | 21.8 | 35.9 | 27.6 | 44.4 |
| Example E1 | 16.0 | 28.7 | 22.4 | 38.2 |
| Example E2 | 12.0 | 25.5 | 16.4 | 32.0 |
| Example E3 | 8.1 | 22.4 | 11.7 | 27.6 |
| Example E4 | 7.9 | 23.3 | 11.0 | 26.9 |

In C1 to C4, C1 (without any stabilizers) showed very poor mechanical properties after hot storage. The material was unusable. The mechanical properties improved when antioxidant was used, but strong discoloration occurred after the UV test.

In E1 to E4, good mechanical properties were achieved by optimal combination of the stabilizers. Only a slight discoloration occurred after UV illumination owing to synergistic effects when epoxide/benzotriazole were used, significantly better than in the case of C3 (only benzotriazole in combination with antioxidant). In the manual casting process (E3), despite good properties of the end products, disadvantages were found in the metering of the solids (dust) and the not-so-flexible handling of the products.

EXAMPLES C5 and E5

1000 parts by weight of polytetrahydrofuran having a mean molecular weight of 1000 were reacted with 1100 parts by weight of 4,4'-MDI and 306 parts by weight of 1,4-butanediol by the manual casting method to give a TPU; in E5, the components indicated in Table 5 were mixed in during the process. The reaction product was processed into test specimens.

The optical and mechanical properties found are shown in Tables 6 to 8.

EXAMPLES C6 and E6

1000 parts by weight of polytetrahydrofuran having a mean molecular weight of 1000 were reacted with 1200 parts by weight of 4,4'-MDI and 342 parts by weight of 1,4-butanediol as well as the amount of antioxidant indicated in Table 5 using the belt process to give a TPU. In E6, 4% by weight, based on the total mix, of a stabilizer concentrate prepared by a method similar to that for the above-described (for Examples E1, E2 and E4) stabilizer concentrate but using the TPU employed for C6/E6 was added and homogeneously mixed in during the process. The reaction product was processed into test specimens.

The optical and mechanical properties found are shown in Tables 6 to 8.

EXAMPLES C7 and E7

1000 parts by weight of a butanediol-hexaneidol adipate having a mean molecular weight of 2000 were reacted with 425 parts by weight of 4,4'-MDI, 10 parts by weight of a carbodiimide as hydrolysis inhibitor and 106 parts by weight of 1,4-butanediol as well as the amount of antioxidant indicated in Table 5 using the belt process to give a TPU. In E7, 4% by weight, based on the total mix, of a stabilizer concentrate prepared using a method similar to that for the above-described (for Examples E1, E2 and E4) stabilizer concentrate but using the TPU employed for C7/ E7 was added and homogeneously mixed in during the process. The reaction product was processed into test specimens.

The optical and mechanical properties found are shown in Tables 6 to 8.

EXAMPLES C8 and E8

1000 parts by weight of an ethylene glycol-butanediol adipate having a mean molecular weight of 2000 were reacted with 440 parts by weight of 4,4'-MDI, 10 parts by weight of a carbodiimide as hydrolysis inhibitor and 110 parts by weight of 1,4-butanediol by the manual casting method to give a TPU and in the process admixed with the components indicated in Table 5. The reaction product was processed into test specimens.

The optical and mechanical properties found are shown in Tables 6 to 8.

TABLE 5

| Example No. | Diglycidyl terephthalate | Triglycidyl trimellitate | Anti-oxidant* | Benzo-triazole* |
| --- | --- | --- | --- | --- |
| Comparison C5 | — | — | — | — |
| Example E5 | 0.25 | 0.25 | — | 0.5% |
| Comparison C6 | — | — | 0.5% | — |
| Example E6 | 0.25 | 0.25 | 0.5% | 0.5% |
| Comparison C7 | — | — | 0.5% | — |
| Example E7 | 0.25 | 0.25 | 0.5% | 0.5% |
| Comparison C8 | — | — | 0.5% | — |
| Example E8 | 0.25 | 0.25 | 0.25% | 0.5% |

Benzotriazole* = 2-(2-hydroxy-3,5-di-tert-amylphenyl)-2H-benzotriazole
Antioxidant* = pentaerythrityl tetrakis [3-(3,5-di-tert-butyl-4-hydroxyphenyl)propionate]

TABLE 6

Intrinsic color of the products

| Example No. | YI | L* | A* | B* |
| --- | --- | --- | --- | --- |
| Comparison C5 | 2.2 | 96.7 | −0.5 | 1.4 |
| Example E5 | 6.5 | 95.9 | −1.1 | 4.3 |
| Comparison C6 | 3.5 | 95.9 | −0.2 | 2.0 |

TABLE 6-continued

Intrinsic color of the products

| Example No. | YI | L* | A* | B* |
| --- | --- | --- | --- | --- |
| Example E6 | 11.3 | 90.8 | −0.4 | 6.4 |
| Comparison C7 | 2.6 | 95.9 | −0.1 | 1.4 |
| Example E7 | 9.0 | 89.2 | 0.1 | 4.7 |
| Comparison C8 | 1.6 | 96.6 | −0.1 | 0.9 |
| Example E8 | 9.1 | 90.0 | −0.1 | 5.0 |

YI  Yellowness Index
L*A*B* Color values from the CIELAB system

TABLE 7

Properties after storage for 500 hours at 130° C. in a convection oven

| Example No. | TS/MPa | EB/% | DE* | YI |
| --- | --- | --- | --- | --- |
| Comparison C5 | 25 | 330 | 107.5 | 147.7 |
| Example E5 | 25 | 360 | 104.2 | 146.1 |
| Comparison C6 | 29 | 330 | 106.2 | 148.3 |
| Example E6 | 34 | 490 | 49.7 | 84.3 |
| Comparison C7 | 38 | 770 | 34.1 | 53.9 |
| Example E7 | 43 | 790 | 30.1 | 47.0 |
| Comparison C8 | 41 | 820 | 37.2 | 56.2 |
| Example E8 | 44 | 790 | 22.3 | 44.4 |

TS  tensile strength      DIN 53 504
EB  elongation at break   DIN 53 504
DE* Delta E* from the LAB* color system (color change compared with unilluminated specimen)
YI  Yellowness Index Small DE* and YI values show low discoloration or yellowing.

TABLE 8

Properties after UV illumination in accordance with DIN 75202 (100° C. black-body temperature)

| Example No. | DE* 300 h | YI 300 h |
| --- | --- | --- |
| Comparison C5 | 27.6 | 43.5 |
| Example E5 | 15.1 | 29.2 |
| Comparison C6 | 28.9 | 46.9 |
| Example E6 | 5.7 | 21.4 |
| Comparison C7 | 46.8 | 66.8 |
| Example E7 | 9.0 | 23.1 |
| Comparison C8 | 44.0 | 65.6 |
| Example E8 | 17.8 | 36.6 |

The additives additionally introduced according to the present invention effect a significant improvement in the UV resistance.

We claim:

1. A stabilized polyurethane comprising a polyurethane and a stabilizer, said stabilizer comprising diglycidyl terephthalate and/or triglycidyl trimellitate in combination with a UV filter comprising a benzotriazole.

2. A stabilized polyurethane as claimed in claim 1, wherein the UV filters comprise 2-(2-hydroxy-3,5-di-tert-amylphenyl)-2H-benzotriazole and/or 1,6-hexanediyl bis(3-(3-{benzotriazol-N-yl}-4-hydroxy-5-tert-butylphenyl) propanoate).

3. A stabilized polyurethane as claimed in claim 1, wherein the stabilizer comprises a combination of diglycidyl terephthalate, triglycidyl trimellitate and 2-(2-hydroxy-3,5-di-tert-amylphenyl)-2H-benzotriazole.

4. A stabilized polyurethane as claimed in claim 1, wherein the stabilizer is present in a total amount of from 0.01 to 3 percent by weight, based on the stabilized polyurethane.

5. A stabilizer concentrate comprising, based on the total weight of the concentrate,
   A) from 20 to 95 percent by weight of at least one polyurethane,
   B) from 3 to 60 percent by weight of diglycidyl terephthalate and/or triglycidyl trimellitate, and
   C) from 3 to 60 percent by weight of at least one UV filter comprising a benzotriazole, where the percentages by weight add up to a total of 100.

6. A stabilizer concentrate as claimed in claim 5, wherein the UV filter comprises 2-(2-hydroxy-3, 5-di-tert-amylphenyl)-2H-benzotriazole and/or 1,6-hexanediyl bis(3-(3-{benzotriazol-N-yl}-4-hydroxy-5-tert-butylphenyl) propanoate).

7. A stabilizer concentrate as claimed in claim 5, wherein the at least one polyurethane is a thermoplastic polyurethane.

8. A process for preparing stabilized polyurethanes comprising reacting organic and/or modified organic polyisocyanates with relatively high molecular weight compounds having molecular weights of 500 or greater containing at least two reactive hydrogen atoms and, optionally, relatively low molecular weight chain extenders and/or crosslinkers having molecular weights less than 500, and also blowing agents in the presence of catalysts, stabilizers and, optionally, further auxiliaries and/or additives, wherein the stabilizers comprise diglycidyl terephthalate and/or triglycidyl trimellitate in combination with a UV filter comprising a benzotriazole.

9. A process for preparing stabilized polyurethanes comprising reacting organic and/or modified organic polyisocyanates with relatively high molecular weight compounds having molecular weights greater than 500, containing at least two reactive hydrogen atoms and, optionally, relatively low molecular weight chain extenders and/or crosslinkers having molecular weights less than 500, and also blowing agents in the presence of catalysts, stabilizer and, optionally, further auxiliaries and/or additives, wherein the stabilizer comprises a concentrate comprising, based on the total weight of the concentrate,
   A) from 20 to 95 percent by weight of at least one polyurethane,
   B) from 3 to 60 percent by weight of diglycidyl terephthalate and/or triglycidyl trimellitate and
   C) from 3 to 60 percent by weight of at least one UV filter comprising a benzotriazole, where the percentages by weight add up to a total of 100 percent.

10. A process as recited in claim 8, wherein the UV filters comprise 2-(2-hydroxy-3, 5-di-tert-amylphenyl)-2H-benzotriazole and/or 1,6-hexanediyl bis(3-(3-{benzotriazol-N-yl}-4-hydroxy-5-tert-butylphenyl) propanoate).

11. A process as recited in claim 8, wherein the stabilizer comprises a combination of diglycidyl terephthalate, triglycidyl trimellitate and 2-(2-hydroxy-3,5-di-tert-amylphenyl)-2H-benzotriazole.

12. A process as recited in claim 8, wherein the stabilizer is present in a total amount of from 0.01 to 3 percent by weight, based on the stabilized polyurethane.

13. A process as recited in claim 9, wherein the at least one UV filter is selected from the group consisting of 2-(2-hydroxy-3,5-di-tert-amylphenyl)-2H-benzotriazole; 1,6-hexanediyl bis(3-(3-{benzotriazol-N-yl}-4-hydroxy-5-tert-butylphenyl) propanoate) and mixtures thereof.

14. A process as recited in claim 9, wherein the concentrate comprises a combination of diglycidyl terephthalate, triglycidyl trimellitate and 2-(2-hydroxy-3,5-di-tert-amylphenyl)-2H-benzotriazole.

15. A process as recited in claim 9, wherein the stabilizer is present in a total amount of from 0.01 to 3 percent by weight, based on the stabilized polyurethane.

16. A stabilized polyurethane as recited in claim 1, wherein the stabilizer comprises diglycidyl terephthalate, triglycidyl trimellitate and a UV filter in a weight ratio of 1:1:2 to 1:1:1, wherein the UV filter comprises a benzotriazole.

17. A stabilizer concentrate as recited in claim 5 comprising diglycidyl terephthalate, triglycidyl trimellitate and UV filter in a weight ratio of 1:1:2 to 1:1:1.

18. A process as recited in claim 9 wherein the stabilizer concentrate comprises diglycidyl terephthalate, triglycidyl trimellitate and UV filter in a weight ratio of 1:1:2 to 1:1:1.

* * * * *